US009122823B2

(12) United States Patent
Agarwal et al.

(10) Patent No.: US 9,122,823 B2
(45) Date of Patent: *Sep. 1, 2015

(54) STACKED MULTIPLE-INPUT DELAY GATES (71) Applicant: International Business Machines Corporation, Armonk, NY (US)

(72) Inventors: Vikas Agarwal, Cedar Park, TX (US); Samantak Gangopadhyay, Atlanta, GA (US); Manish Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,473

(22) Filed: Dec. 20, 2013

(65) Prior Publication Data
US 2015/0178427 A1 Jun. 25, 2015

(51) Int. Cl.
*G06F 17/50* (2006.01)

(52) U.S. Cl.
CPC .......... *G06F 17/5031* (2013.01); *G06F 17/505* (2013.01); *G06F 17/5072* (2013.01); *G06F 17/5077* (2013.01); *G06F 17/5081* (2013.01)

(58) Field of Classification Search
CPC ............ G06F 17/5081; G06F 17/5072; G06F 17/5077; G06F 17/5031; G06F 17/505
USPC ................. 716/113, 122, 129, 134, 104, 108; 703/16
See application file for complete search history.

(56) References Cited

U.S. PATENT DOCUMENTS

| 5,841,967 | A | * | 11/1998 | Sample et al. .................. 714/33 |
| 5,878,055 | A | | 3/1999 | Allen |
| 6,111,444 | A | | 8/2000 | Mikan, Jr. et al. |
| 6,427,226 | B1 | * | 7/2002 | Mallick et al. ................ 716/113 |
| 6,574,781 | B1 | * | 6/2003 | Harada et al. ................. 716/114 |
| 6,696,864 | B2 | | 2/2004 | Yamashita et al. |
| 6,701,505 | B1 | | 3/2004 | Srinivasan |

(Continued)

FOREIGN PATENT DOCUMENTS

| EP | 2053652 A1 | 4/2009 |
| EP | 2120267 B1 | 8/2013 |

(Continued)

OTHER PUBLICATIONS

Jang (Korean Document No. KR 2001026903 A, published Apr. 6, 2001, Dewrent English abstract and 1 drawing only).*

(Continued)

*Primary Examiner* — Phallaka Kik
(74) *Attorney, Agent, or Firm* — Isaac J. Gooshaw (57) ABSTRACT

Embodiments of the present invention disclose a method, program product, and a logic circuit structure for correcting early-mode timing violations in a digital circuit design. A portion of a digital circuit design is identified having an early-mode timing violation. A logic circuit is identified within the identified portion of a digital circuit design having the early-mode timing violation. At least one input of the identified logic circuit is identified as having the early-mode timing violation. At least one transistor is added to the identified logic circuit, wherein the input of the added at least one transistor is coupled to the identified at least one input of the identified logic circuit, and wherein the addition of the at least one transistor delays the signal received at the identified at least one input to eliminate the early-mode timing violation.

14 Claims, 6 Drawing Sheets

(56) References Cited

U.S. PATENT DOCUMENTS

| | | | |
|---|---|---|---|
| 6,966,046 | B2 | 11/2005 | Curran et al. |
| 7,131,082 | B2 | 10/2006 | Tsukiyama et al. |
| 7,266,787 | B2 | 9/2007 | Hughes et al. |
| 7,278,126 | B2 | 10/2007 | Sun et al. |
| 7,590,957 | B2 | 9/2009 | Walian et al. |
| 7,880,498 | B2 | 2/2011 | Habel et al. |
| 7,982,504 | B1 | 7/2011 | Robinett |
| 7,996,812 | B2 | 8/2011 | Kotecha et al. |
| 8,143,919 | B2 | 3/2012 | Kurokawa |
| 8,205,182 | B1 | 6/2012 | Zlatanovici et al. |
| 8,341,578 | B2 | 12/2012 | Campbell et al. |
| 8,479,136 | B2 * | 7/2013 | Hopkins et al. ............... 716/122 |
| 8,539,408 | B1 | 9/2013 | Cheng et al. |
| 2001/0017418 | A1 | 8/2001 | Noguchi et al. |
| 2002/0053063 | A1 | 5/2002 | Bhattacharya et al. |
| 2003/0229873 | A1 * | 12/2003 | Casavant .......................... 716/6 |
| 2003/0231040 | A1 | 12/2003 | Masleid et al. |
| 2003/0233628 | A1 | 12/2003 | Rana et al. |
| 2003/0234430 | A1 | 12/2003 | Friend et al. |
| 2004/0221247 | A1 | 11/2004 | Andreev et al. |
| 2005/0155001 | A1 * | 7/2005 | Kinoshita et al. ................. 716/2 |
| 2007/0046330 | A1 | 3/2007 | Forbes |
| 2008/0010626 | A1 | 1/2008 | Correale, Jr. |
| 2008/0141198 | A1 | 6/2008 | Chen et al. |
| 2009/0011552 | A1 | 1/2009 | Doris et al. |
| 2009/0210841 | A1 | 8/2009 | Prakash et al. |
| 2010/0070933 | A1 * | 3/2010 | Quach ............................... 716/2 |
| 2010/0133587 | A1 | 6/2010 | Wang |
| 2010/0169846 | A1 | 7/2010 | Gupta et al. |
| 2010/0169847 | A1 * | 7/2010 | Gupta et al. ...................... 716/2 |
| 2010/0231263 | A1 | 9/2010 | Fish et al. |
| 2011/0191732 | A1 * | 8/2011 | Iyer et al. ...................... 716/108 |
| 2012/0284676 | A1 | 11/2012 | Hopkins et al. |
| 2013/0069703 | A1 | 3/2013 | Gasper et al. |
| 2013/0125077 | A1 * | 5/2013 | Rozen et al. .................. 716/119 |
| 2013/0321054 | A1 | 12/2013 | Gasper et al. |
| 2014/0040844 | A1 | 2/2014 | Visweswariah et al. |
| 2014/0082577 | A1 * | 3/2014 | Gasper et al. ................. 716/114 |
| 2014/0129887 | A1 * | 5/2014 | Lin et al. ....................... 714/729 |
| 2014/0298282 | A1 * | 10/2014 | Agarwal et al. ............... 716/114 |

FOREIGN PATENT DOCUMENTS

| | | |
|---|---|---|
| WO | 0122494 A1 | 3/2001 |
| WO | 2008014104 A2 | 1/2008 |

OTHER PUBLICATIONS

Knepper, "CMOS Technology Logic Circuit Synthesis", 2002, Knepper, r., Power Point Presentation, pp. 1-35.

Skorka et al., "Design and Fabrication of Vertically-Integrated CMOS Image Sensors," pp. 4512-4538, Sensors 2011, 11, Pulished: Apr. 27, 2011, doi: 10.3390/s110504512, <http://www.ncbi.nlm.nih.gov/pmc/articles/PMC3231395/>.

* cited by examiner

STACKED MULTIPLE-INPUT DELAY GATES

FIELD OF THE INVENTION

The present invention relates generally to the field of designing digital circuits of semiconductor chips, and more particularly to improving the timing in digital circuit designs while minimizing area loss.

BACKGROUND OF THE INVENTION

Design of semiconductor integrated circuits has moved from an essentially graphic process to a textual programming language process. Electronic design automation (EDA) is a collection of software tools used to both design and analyze integrated circuits. Design flows for chip design include logic synthesis, placement, routing, and analysis. Design flow steps can be performed in order, or some steps may be integrated to efficiently create an optimized circuit design. Logic synthesis is the process of expressing each functional circuit design requirement into a representation of physical logic circuits or gates. The logic circuits are summed up in a netlist for the design. Placement is the process where all components of a netlist are physically placed on a map of the chip area while optimizing wire length, longest path, congestion, and power consumption. Routing is the process where all the placed components are wired together. At this point, a rough physical design is complete, and the design flow proceeds to analysis.

Analysis of circuit designs may include simulation, physical verification, and static timing analysis (STA). Simulation includes methods, such as transistor simulation, logic simulation, or behavioral simulation. Physical verification is the process of determining the manufacturability of an integrated circuit design. Static timing analysis (STA) is a method for computing the timing of a digital circuit design, particularly looking for hold time violations and setup time violations. An early mode, or hold time violation occurs when data arrives too early to be properly latched into a storage element. A late mode, or setup time violation occurs when data arrives too late. Based on the timing analysis, extra delay books, delay inverters or buffers are added to the digital circuit design to slow down signals that arrive too early. Delay books or delay inverters take up valuable area in the chip design which may already be congested.

SUMMARY

Embodiments of the present invention disclose a method, program product, and a logic circuit structure for correcting early-mode timing violations in a digital circuit design. A portion of a digital circuit design is identified having an early-mode timing violation. A logic circuit is identified within the identified portion of a digital circuit design having the early-mode timing violation. At least one input of the identified logic circuit is identified as having the early-mode timing violation. At least one transistor is added to the identified logic circuit, wherein the input of the added at least one transistor is coupled to the identified at least one input of the identified logic circuit, and wherein the addition of the at least one transistor delays the signal received at the identified at least one input to eliminate the early-mode timing violation.

DETAILED DESCRIPTION

Embodiments of the present invention illustrate a method for correcting early-mode timing violations using stacked multiple input complementary metal-oxide semiconductor (CMOS) gates. The present invention may be performed in manual design environments, or in electronic design automation (EDA) environments. Correcting early-mode timing violations in a congested digital circuit design with no or minimal area penalty by stacking single or multiple inputs of a multiple input CMOS gate may provide a digital circuit design advantage. In embodiments of the present invention, stacking means swapping the single transistor connected to a fast input signal, with two or more transistors connected in series with the drain of one transistor connected to the source of the next transistor, and the gate inputs of the two or more transistors connected to the same fast input signal. The connection of two or more transistors creates a greater capacitive load on the digital circuit, and delays a response of the fast input signal on the two or more transistors until substantially the same time as a response of a slow input signal on the circuit. In embodiments of the present invention, partial stacking may be used to delay one or both of the rising and falling edge of the fast input signal. Partial stacking means adding one or more transistors in only the pull-up or pull-down side of a CMOS circuit to delay either the rising or falling edge of a fast input signal, respectively. Stacking and partial stacking may be extended to any multiple input CMOS logic circuits including, but not limited to, AOI, OAI, NAND, NOR, XOR, and XNOR. Further, stacking and partial stacking may be extended to any multiple input logic circuits including, but not limited to, AND or OR. In other embodiments, stacking of transistors may be used in non-CMOS logic circuits to delay incoming fast signals.

As will be appreciated by one skilled in the art, aspects of the present invention may be embodied as a method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

As used herein, "logic" such as control logic, can be a sequence of steps required to perform a specific function, and, in an embodiment, is implemented through hardwired computer circuits and other hardware or, alternatively, firmware, such as low-level program instructions stored on a read only memory (ROM) and executed by one or more control circuits.

As used herein, a "computer processor," or "microprocessor," can be a semiconductor chip that resides in computers, smart phones, and other electronic devices. A microprocessor can contain integrated circuits and other sequential digital logic components. The basic job of the computer processor is to receive input and provide the appropriate output by interpreting and executing commands from the computer's hardware and software.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It may be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. Thus, the present invention is not limited to the embodiments shown, but is to be accorded the widest scope consistent with the principles and features disclosed herein.

Implementation of embodiments of the invention may take a variety of forms, and exemplary implementation details are discussed subsequently with reference to the Figures. The embodiment illustrated in the Figures describes an apparatus to recover digital signal transmissions. Specific details disclosed herein are not to be interpreted as limiting, but merely as a representative basis for teaching one skilled in the art to variously employ the methods and structures of the present disclosure.

Figure 1:
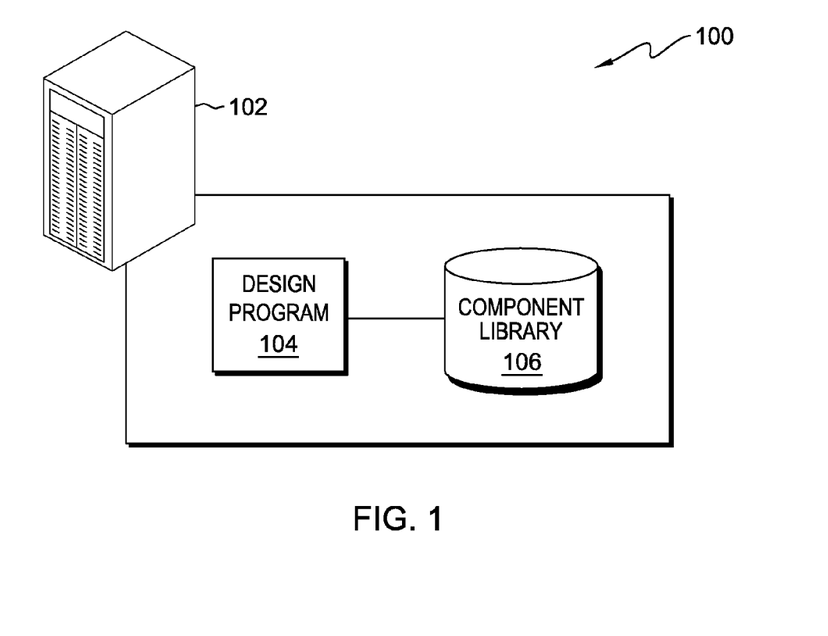
FIG. 1 is a block diagram illustrating an electronic design automation environment, in accordance with one embodiment of the present invention.

The present invention will now be described in detail with reference to the Figures. FIG. 1 is a block diagram illustrating an electronic design automation (EDA) environment, generally designated 100, in accordance with one embodiment of the present invention. In one embodiment, EDA environment 100 includes computer 102 which includes design program 104 and component library 106.

Computer 102 may be a specialized server computer, a laptop computer, a tablet computer, a netbook computer, a personal computer (PC), a desktop computer, a personal digital assistant (PDA), a smart phone, or any programmable electronic device. In certain embodiments, computer 102 represents a computer system utilizing clustered computers and components that act as a single pool of seamless resources when accessed through a network, as is common in data centers and with cloud computing applications. In general, computer 102 is representative of any programmable electronic device or combination of programmable electronic devices capable of executing machine-readable program instructions and communicating with other computing devices via a network. Exemplary components of computer 102 are described in greater detail with regard to FIG. 9.

Design program 104 may be any automated chip design and analysis software, customized chip design software, or manual chip design software with a connection to component library 106. Design program 104 has the capability to perform all aspects of the design flow including, but not limited to, logic synthesis, placement, routing, analysis, and sign-off. Design program 104 may be a collection of circuit design software tools that are partially or fully integrated into a single software package, or each tool may be completely separate software programs. Dual timing mode analysis tools of design program 104 search for both early-mode timing violations and late-mode timing violations. An early mode padding tool of design program 104 corrects early-mode timing violations, such as hold violations, by various methods including: resizing existing logic gates, swapping of functional latch output pins with respective scan pins, increasing threshold voltage of selected devices, and adding delay blocks to the incoming lines of logic circuits.

Component library 106 may be a standard cell library, or customized cell library which includes, but is not limited to: a collection of low-level electronic logic functions such as AND, OR, INVERT, flip-flops, latches, and buffers. A standard cell is a group of transistors, resistors, and other interconnecting structures that provides a Boolean logic function or a storage function. The cell library may contain height, width, layout, power consumption, timing, and noise information for each cell. In an embodiment, a user may create customized cells for storage in component library 106. Component library 106 may be fully integrated, partially integrated or completely separate from design program 104.

In an alternate embodiment of the present invention, EDA environment 100 is replaced with a manual chip design environment, wherein chip designs are created graphically without automation.

Figure 2:
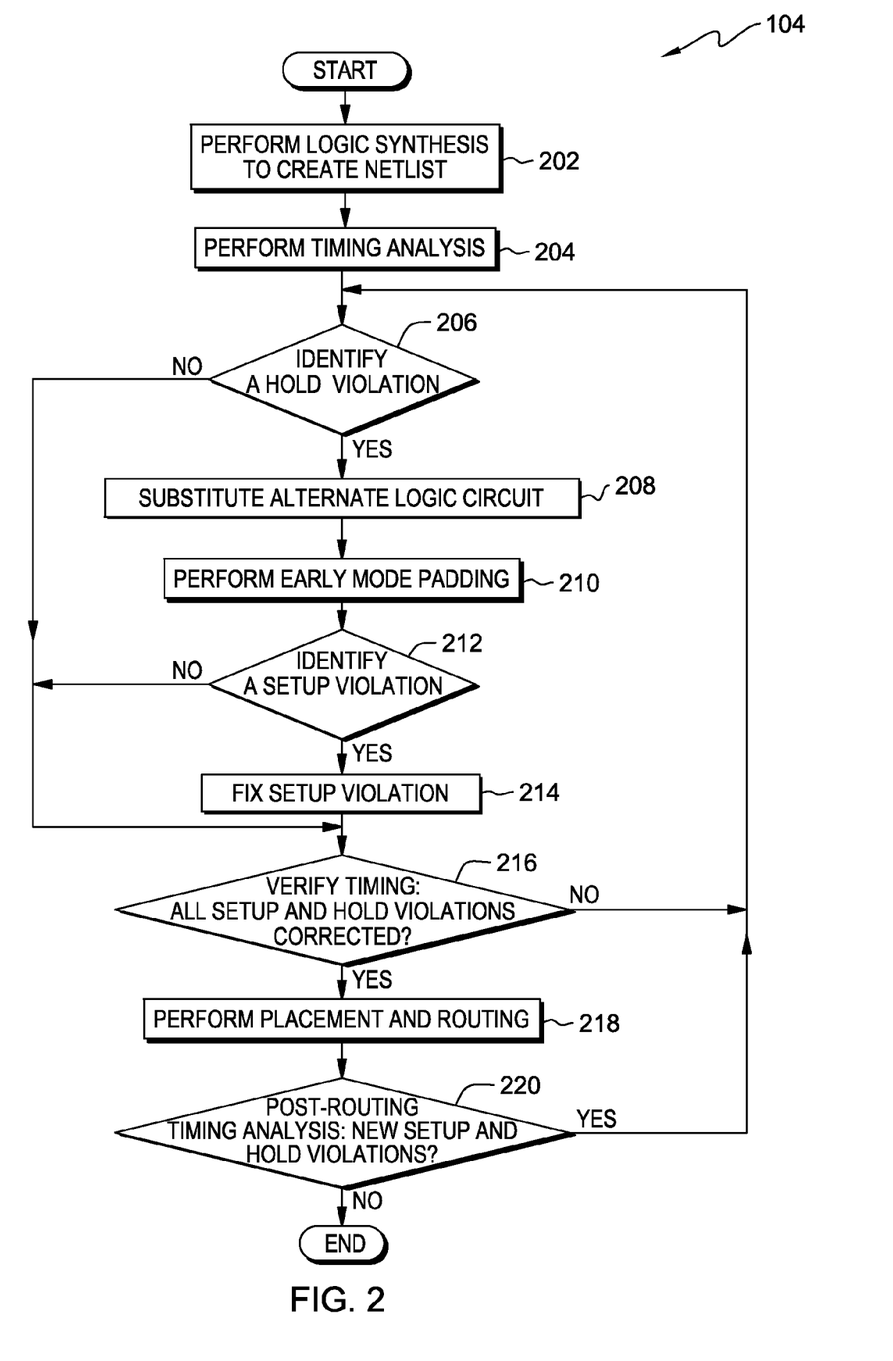
FIG. 2 is a flowchart of a design flow for creating an integrated circuit design by a design program, in accordance with an embodiment of the present invention.

FIG. 2 is a flowchart of a design flow for creating an integrated digital circuit design by design program 104, in accordance with an embodiment of the present invention. Design program 104 provides the tools to follow a design flow for creating a digital circuit design. In other embodiments, a chip designer may perform the design flow in a manual design environment. A person of ordinary skill in the art will recognize that there may be other steps in the design flow that have been removed to simplify the illustration of the present invention.

Design program 104 performs logic synthesis to create a netlist based on requirements input from a user or from another program (step 202). Logic synthesis is the process of expressing each functional circuit design requirement provided by a circuit designer into a representation of logic gates. The logic gates are then translated into cells of transistor level circuit components forming logic circuits and are collected into a netlist for a digital circuit design. In the illustrative embodiment, the netlist includes a cell with at least a portion of a digital circuit design having an early-mode timing violation, or hold violation.

Design program 104 performs timing analysis of a digital circuit design, which includes analysis of early-mode timing and late-mode timing (step 204). In the illustrative embodiment, design program 104 performs timing analysis on each cell of the netlist to detect early-mode timing violations and late-mode timing violations. Static timing analysis (STA) is a method for computing the timing of a digital circuit design, looking for early-mode timing and late-mode timing violations. Early-mode timing violations, or hold violations occur when data arrives too early to be properly latched into a storage element. Late-mode timing violations, or setup violations, occur when data arrives too late to be properly latched into a storage element. STA may be performed in a dual timing mode environment, or a single timing mode environment. In the case of multiple-input logic circuits, if a fast signal arrives at a logic circuit input ahead of a slow signal at a second input, no changes are required as long as a hold or setup violation is not created at a latch input or a primary circuit output within the design.

Design program 104 reaches step 206 of the flowchart in multiple ways, including step 204, step 216, and step 220 at different points in the design flow. Decision blocks 206 and 212 may be performed in parallel, or one at a time as shown in the flowchart until all hold and setup violations are corrected, including new ones that arise from changes to the digital circuit design at each step in the design flow. Design program 104 loops through steps 206, 208, 210, 212, and 214 as many times as needed to correct all hold and setup violations.

Design program 104 identifies any early-mode timing or hold violations in each cell of a digital circuit design (decision block 206). If a hold violation is not found (no branch, decision block 206), design program 104 verifies timing to ensure all setup and hold violations are corrected (step 216). In an embodiment, if a hold violation is detected related to a logic circuit in a cell, (yes branch, decision block 206), design program 104 substitutes the identified logic circuit with an alternate logic circuit comprising a stacked input logic circuit (step 208) which serves to delay the incoming signal determined to be causing the hold violation while still performing the original logic function. Design program 104 selects alternate logic circuits from within component library 106 for correction of early-mode timing violations. In some embodiments, the alternate logic circuits may already exist in component library 106. In other embodiments, the user may need to create the alternates and store them in component library 106 before first use. In other embodiments, the alternate logic circuit may be created manually or automatically on the fly, and directly inserted into the digital circuit design.

In one example, a logic circuit with a detected early-mode timing violation includes at least one input with a fast input signal, and at least one input with a slow input signal. In one embodiment, design program 104 selects an alternate logic circuit including the original logic circuit with the addition of at least one transistor to at least one input transistor of the logic circuit to create a greater capacitive load than the original input transistor alone, and to delay the response of the fast input signal compared to the response of the slow input signal. The alternate logic circuit may have an additional one or more transistors connected in series to the original input transistor, where the input terminals of each additional transistor and the original input transistor are coupled to the fast input signal, and the drain of one transistor is connected to the source of the next transistor. In a logic circuit where at least one input with a slow input signal is connected in series with at least one input with a fast input signal, the slow input signal may also get delayed by a lesser amount than the fast input signal when an additional transistor is connected to the original input with a fast input signal.

In another example, a logic circuit with a detected early-mode timing violation includes more than one input with fast input signals. In one embodiment, design program 104 selects an alternate logic circuit including the original logic circuit with the addition of at least one transistor to each of the more than one input transistors of the logic circuit to create a greater capacitive load than the original input transistors alone, and to delay the response of the fast input signals overall allowing for proper latching, and proper output within the design.

CMOS logic circuits use both p-type metal-oxide semiconductor (PMOS) transistors, and n-type metal-oxide semiconductor (NMOS) transistors to form circuits representing logic gates. In some embodiments, the additional transistors are connected to either the NMOS portion of a CMOS logic circuit, the PMOS portion of a CMOS logic circuit, or both. Any additional transistors connected to the NMOS portion delays the falling edge of the fast input signal, and any additional transistors connected to the PMOS portion delays the rising edge of the fast input signal. In circumstances where additional transistors are connected to both the NMOS and PMOS portion of a logic circuit, one edge of the input signal typically has a stronger delay response than the other. The stronger delay response relates to variation in CMOS fabrication processes, and to unbalanced CMOS designs within the NMOS and PMOS portions.

After all substitutions, design program 104 performs early mode padding on the digital circuit design (step 210). Based on the timing analysis, a number of delay books, such as paired inverters or delay gates, are added to the digital circuit design to slow down signals that arrive too early. Delay books are used to slow down all signals coming into a logic gate instead of selecting certain incoming signals. Typically, delay books delay incoming signals by four to ten times more than adding a single NMOS OR PMOS transistor to a logic circuit input depending on the technology, gain, and threshold voltage used. The combination of delay books and stacked transistors allows for more refinement of signal delay than just delay books alone. In some circumstances, stacked input logic circuits obviate the need for added delay books, saving area and routing resources in the final digital circuit design.

Design program 104 identifies late-mode timing or setup violations in each cell of a digital circuit design (decision block 212). If a setup violation is not found (no branch, decision block 212), design program 104 verifies timing to ensure all setup and hold violations are corrected (step 216). If a setup violation is detected (yes branch, decision block 212), design program 104 corrects the setup violation (step 214), and then verifies timing to ensure all setup and hold violations are corrected (step 216). To correct the setup violation, design program 104 may change the size of delay books to optimize the identified digital circuit. If a new setup violation is detected after any substitutions of alternate logic circuits, design program 104 may substitute an alternate stacked input logic circuit for the one chosen in step 208, substitute an alternate delay book, or both, to optimize the identified digital circuit.

Design program 104 verifies timing to ensure all setup and hold violations are corrected (step 216). If all setup and hold violations are not corrected (no branch, decision block 216), design program 104 identifies a hold violation (decision block 206). In particular, design program 104 looks for new late-mode timing, or setup, violations created after substitution of an alternate logic circuit. Embodiments of the present invention provide for the substitution of stacked input logic circuits with the intention of correcting early-mode timing, or hold time, violations without generating new late-mode timing, or setup, violations.

If all setup and hold violations are corrected (yes branch, decision block 216), design program 104 performs placement and routing (step 218). At this point in digital circuit design, all components of a netlist are mapped onto a chip area while optimizing wire length, longest path, congestion, and power consumption. After placement is completed, design program 104 performs routing wherein all the placed components are wired together. If placement and routing was previously performed before identifying hold violations (step 206) and after post-routing timing analysis (decision block 220), the placement and routing (step 218) may be performed in an engineering change order mode, such that only the affected circuits are placed and routed.

Design program 104 performs post-routing timing analysis to identify new setup and hold violations (step 220). If new setup and/or hold violations are found (yes branch, decision block 220), design program 104 identifies a hold violation (decision block 206). If new setup and/or hold violations are not found (no branch, decision block 220), design program 104 continues to the end of the flowchart. A person of ordinary skill in the art will recognize that more steps may be required to finalize a digital circuit design than are shown here.

In other embodiments, the steps of the flow chart may also be performed where timing analysis and selection of either logic circuits or delay books is an integrated process with reduced steps. In other embodiments, early mode padding and substitution of stacked input logic circuits may be executed at any optimization stage in the design flow including, but not limited to: the initial design stage using hardware description languages, after logic synthesis and before placement, after placement and before routing, post-routing optimization, or as late as sign-off stage.

FIGS. 3 through 6, illustrate alternatives to standard two input CMOS logic gates in accordance with embodiments of the present invention. CMOS logic uses both p-type metal-oxide semiconductor (PMOS) transistors, and n-type metal-oxide semiconductor (NMOS) transistors to form circuits representing logic gates. PMOS transistors are arranged between the logic gate output (Y), and the positive supply voltage (VDD). PMOS transistors form the "pull-up" side of the circuit, meaning the desired output is high voltage. NMOS transistors are arranged between the logic gate output (Y), and the negative supply voltage or ground connection (GND). NMOS transistors form the "pull-down" side of the circuit, meaning the desired output is low voltage.

In each illustration, the circuit representing the CMOS logic gate has two incoming signals, signal A and signal B. In the Figures, A represents the inputs for signal A, and B represents the inputs for signal B. Signal B is considered the "fast" signal, and is responsible for the early-mode timing violation or hold violation. Signal A and signal B each connect to at least one PMOS and at least one NMOS transistor within each illustrated circuit. Embodiments of the present invention slow down signal B to more closely match signal A by using stacked transistors at the inputs of signal B on a CMOS logic gate circuit. Stacking an input means shorting the gate of two or more transistors, and connecting a common signal to that input. Each additional transistor stacked at an input and connected to the same incoming signal creates an additional capacitive load on that input portion of the circuit thereby slowing down the release of the signal into the remainder of the circuit.

Partial or skewed stacking means adding one or more transistors to only one side of a CMOS logic gate, PMOS or NMOS side, to delay either the rising or falling edge of an incoming signal, respectively. In some embodiments, additional transistors are added to only one side, either the PMOS or NMOS side, depending on the details of the early-mode timing violation. An additional PMOS transistor delays the rising edge of the incoming signal B, and an additional NMOS transistor delays the falling edge of the incoming signal B.

Figure 3:
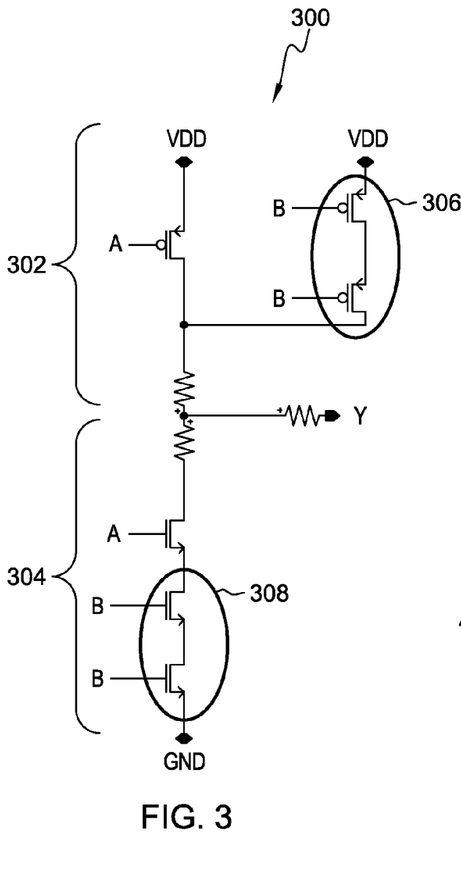
FIG. 3 is an illustration of a NAND2 circuit with a stacked delay feature, in accordance with an embodiment of the present invention.

FIG. 3 is an illustration of a NAND2 circuit with a stacked delay feature, in accordance with an embodiment of the present invention. In an illustrative embodiment of the present invention, an additional transistor is added to a two input CMOS NAND gate, i.e., circuit 300, at the inputs of signal B on both the PMOS and NMOS side. Signal B is the "fast" signal causing the early-mode timing violation or hold violation. Section 302 of circuit 300 is the PMOS or "pull-up" side of the CMOS NAND gate. Circle 306 encloses an original and an additional PMOS transistor connected in series on the PMOS side of circuit 300. Section 304 of circuit 300 is the NMOS or "pull-down" side of the CMOS NAND gate. Circle 308 encloses an original and an additional NMOS transistor connected in series on the NMOS side of circuit 300. The additional PMOS transistor of circle 306 delays the rising edge of the incoming signal B, and the additional NMOS transistor of circle 308 delays the falling edge of the incoming signal B. The relative delay between the rising edge and the falling edge is one to five.

Figure 4:
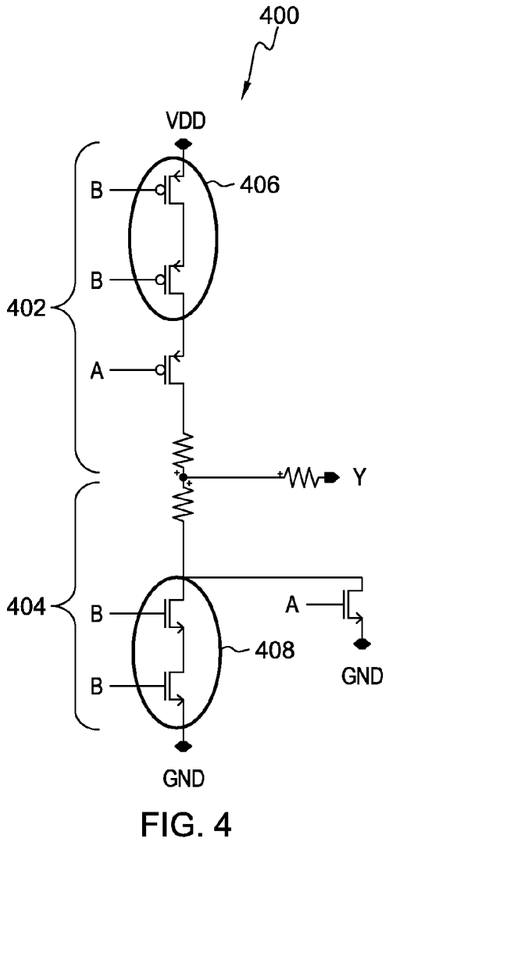
FIG. 4 is an illustration of a NOR2 circuit with a stacked delay feature, in accordance with an embodiment of the present invention.

FIG. 4 is an illustration of a NOR2 circuit with a stacked delay feature, in accordance with an embodiment of the present invention. In an illustrative embodiment of the present invention, an additional transistor is added to a two input CMOS NOR gate, i.e., circuit 400, at the inputs of signal B on both the PMOS and NMOS side. Signal B is the "fast" signal causing the early-mode timing violation or hold violation. Section 402 of circuit 400 is the PMOS side of the CMOS NOR gate. Circle 406 encloses an original and an additional PMOS transistor connected in series on the PMOS side of circuit 400. Section 404 of circuit 400 is the NMOS side of the CMOS NOR gate. Circle 408 encloses an original and an additional NMOS transistor connected in series on the NMOS side of circuit 400. The additional PMOS transistor of circle 406 delays the rising edge of the incoming signal B, and the additional NMOS transistor of circle 408 delays the falling edge of the incoming signal B. The relative delay between the rising edge and the falling edge is five to one.

Figure 5:
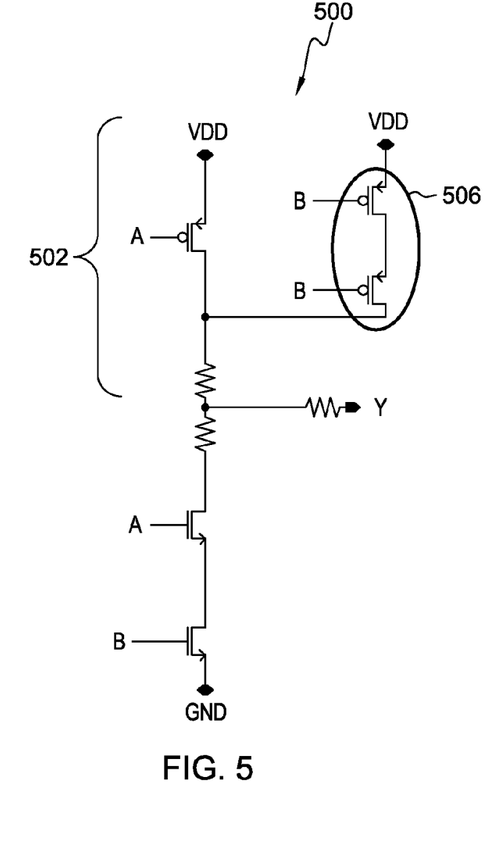
FIG. 5 is an illustration of a NAND2 circuit with a PMOS only stacked delay feature, in accordance with an embodiment of the present invention.

FIG. 5 is an illustration of a NAND2 circuit with a PMOS only stacked delay feature, in accordance with an embodiment of the present invention. In an illustrative embodiment of the present invention, an additional transistor is added to a two input CMOS NAND gate, i.e., circuit 500, at the inputs of signal B on only the PMOS side. Signal B is the "fast" signal causing the early-mode timing violation or hold violation. Section 502 of circuit 500 is the PMOS side of the CMOS NAND gate. Circle 506 encloses an original and an additional PMOS transistor connected in series on the PMOS side of circuit 500. The NMOS side of the CMOS NAND gate is standard without any additional NMOS transistors. The additional PMOS transistor of circle 506 delays the rising edge of the incoming signal B. The relative delay between the rising edge and the falling edge is one to one-half.

The above is a favorable case for NAND gates where the PMOS side is normally faster and smaller than the NMOS side. Stacking the PMOS side balances the faster signal B with the faster rising edge to the slower signal A with slower falling edge, and saves area as the PMOS side is smaller in area compared to the NMOS side in a typical NAND2 design.

Figure 6:
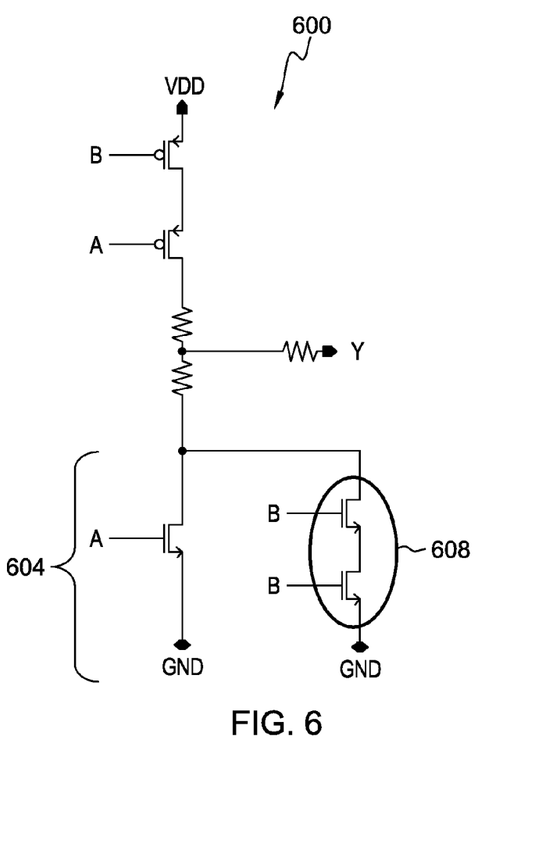
FIG. 6 is an illustration of a NOR2 circuit with an NMOS only stacked delay feature, in accordance with an embodiment of the present invention.

FIG. 6 is an illustration of a NOR2 circuit with an NMOS only stacked delay feature, in accordance with an embodiment of the present invention. In an illustrative embodiment of the present invention, an additional transistor is added to a two input CMOS NOR gate, i.e., circuit 600, at the inputs of signal B on only the NMOS side. Signal B is the "fast" signal causing the early-mode timing violation or hold violation. Section 604 of circuit 600 is the NMOS side of the CMOS NOR gate. Circle 608 encloses an original and an additional NMOS transistor connected in series on the NMOS side of circuit 600. The PMOS side of the CMOS NOR gate is standard without any additional PMOS transistors. The additional NMOS transistor of circle 608 delays the falling edge of the incoming signal B. The relative delay between the rising edge and the falling edge is one-half to one.

The above is a favorable case for NOR gates where the NMOS side is normally faster and smaller than the PMOS side. Stacking the NMOS side balances the faster signal B with faster falling edge to the slower signal A with slower rising edge, and saves area as the NMOS side is smaller in area compared to PMOS side in a typical NOR2 design.

Figure 7:
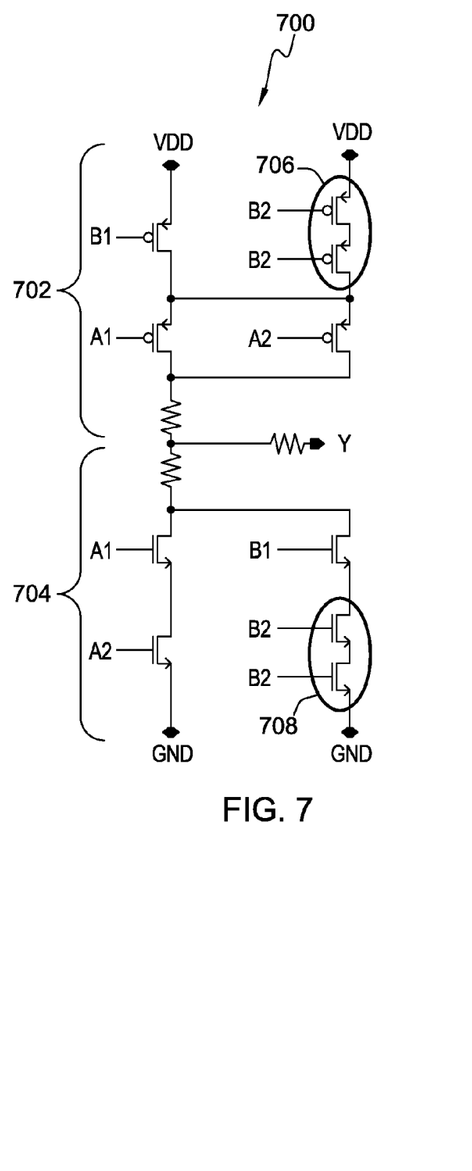
FIG. 7 is an illustration of an AOI22 circuit with a stacked delay feature, in accordance with an embodiment of the present invention.
Figure 8:
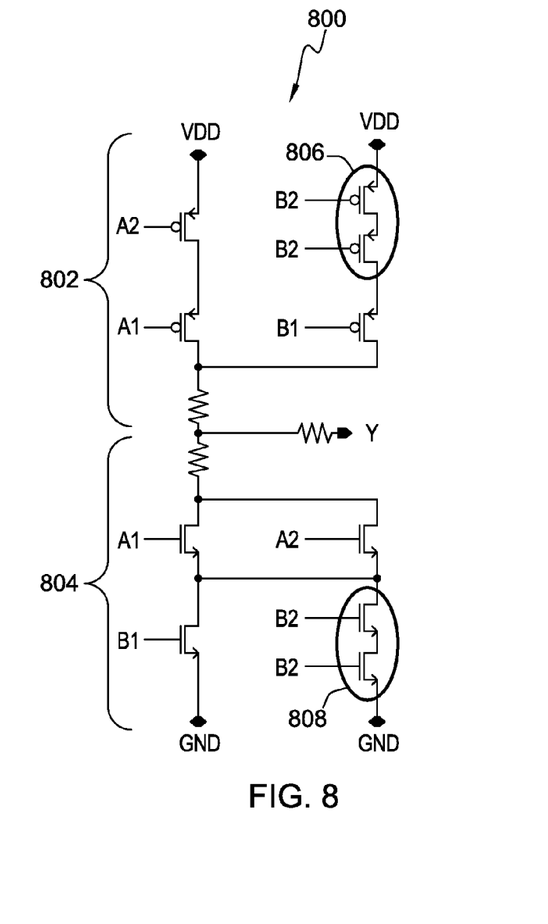
FIG. 8 is an illustration of an OAI22 circuit with a stacked delay feature, in accordance with an embodiment of the present invention.

FIGS. 7 and 8 illustrate alternatives to standard four input CMOS logic gates in accordance with embodiments of the present invention. In each illustration, the circuit representing the CMOS logic gate has four incoming signals: signal A1, signal A2, signal B1, and signal B2. In the Figures, A1 represents the inputs for signal A1, and B1 represents the inputs for signal B1, with similar representations for signal A2 and signal B2. Signal B2 is considered the "fast" signal, and is responsible for the early-mode timing violation or hold violation. Signals A1, A2, B1 and B2 each connect to at least one PMOS and at least one NMOS transistor within each illustrated circuit. Embodiments of the present invention slow signal B2 to more closely match signal A1, signal A2, and signal B1 by using stacked transistors at the inputs of signal B2 on a CMOS logic gate circuit.

FIG. 7 is an illustration of an AOI22 circuit with a stacked delay feature, in accordance with an embodiment of the present invention. In an illustrative embodiment of the present invention, an additional transistor is added to a multiple input CMOS AOI (AND OR INVERT) gate, i.e., circuit 700, at the inputs of signal B2 on both the PMOS and NMOS side. Signal B2 is the "fast" signal causing the early-mode timing violation or hold violation. Section 702 of circuit 700 is the PMOS side of the CMOS AOI gate. Circle 706 encloses an original and an additional PMOS transistor connected in series on the PMOS side of circuit 700. Section 704 of circuit 700 is the NMOS side of the CMOS AOI gate. Circle 708 encloses an original and an additional NMOS transistor connected in series on the NMOS side of circuit 700. The additional PMOS transistor of circle 706 delays the rising edge of the incoming signal B2, and the additional NMOS transistor of circle 708 delays the falling edge of the incoming signal B2. The relative delay between the rising edge and the falling edge is three to five.

FIG. 8 is an illustration of an OAI22 circuit with a stacked delay feature, in accordance with an embodiment of the present invention. In an illustrative embodiment of the present invention, an additional transistor is added to a multiple input CMOS OAI (OR AND INVERT) gate, i.e., circuit 800, at the inputs of signal B2 on both the PMOS and NMOS side. Signal B2 is the "fast" signal causing the early-mode timing violation or hold violation. Section 802 of circuit 800 is the PMOS side of the CMOS OAI gate. Circle 806 encloses an original and an additional PMOS transistor connected in series on the PMOS side of circuit 800. Section 804 of circuit 800 is the NMOS side of the CMOS OAI gate. Circle 808 encloses an original and an additional NMOS transistor connected in series on the NMOS side of circuit 800. The additional PMOS transistor of circle 806 delays the rising edge of the incoming signal B2, and the additional NMOS transistor of circle 808 delays the falling edge of the incoming signal B2. The relative delay between the rising edge and the falling edge is five to three.

FIGS. 3 through 8 are illustrative of the present invention which may be extended to other multiple input CMOS devices including, but not limited to, OIA, OAI, NAND, NOR, XOR, or XNOR. The stacking can be complete, PMOS and NMOS side, or partial, PMOS only or NMOS only. The stacking may be applied to all inputs of a logic circuit, or selectively to a single input.

Figure 9:
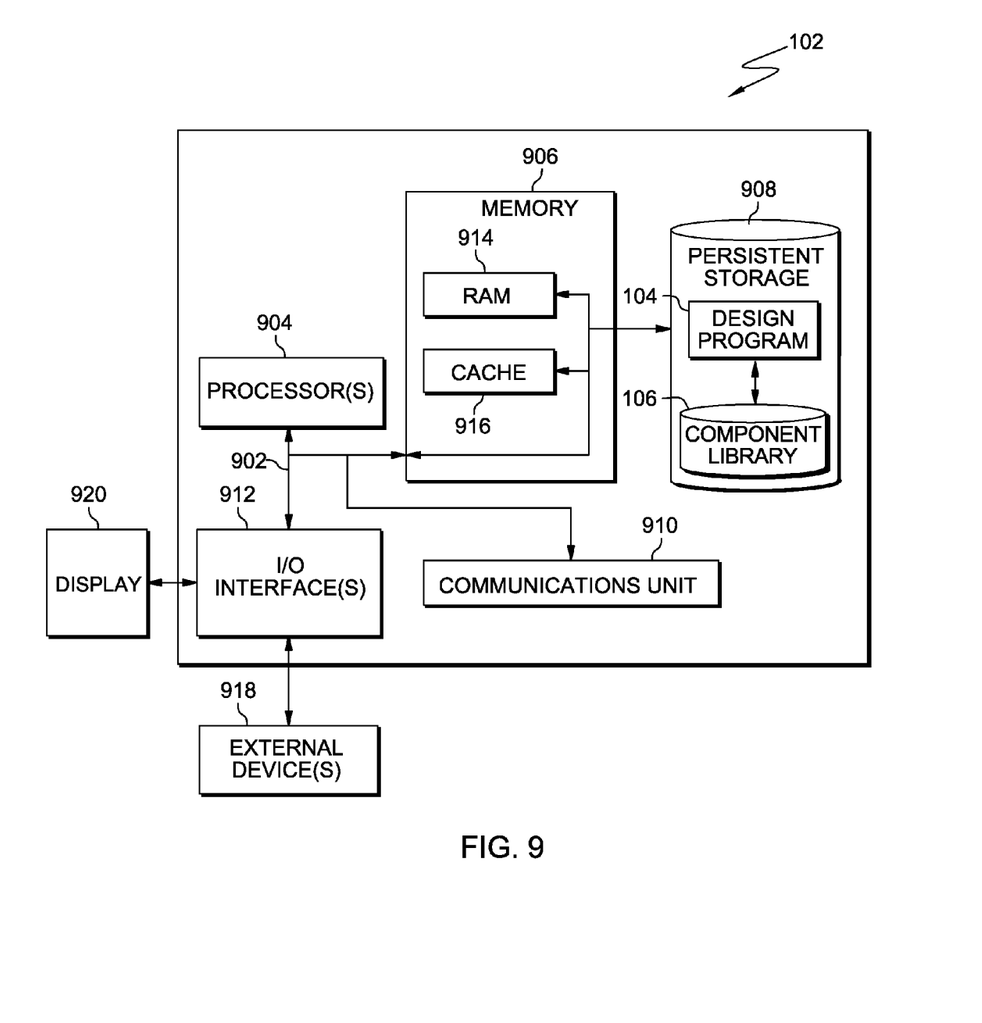
FIG. 9 depicts a block diagram of components of an exemplary computer system for implementing embodiments of the present invention.

FIG. 9 depicts a block diagram of components of computer 102 in accordance with an illustrative embodiment of the present invention. It may be appreciated that FIG. 9 provides only an illustration of one implementation and does not imply any limitations with regard to the environments in which different embodiments may be implemented. Many modifications to the depicted environment may be made.

Computer 102 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 914 and cache memory 916. In general, memory 906 can include any suitable volatile or non-volatile computer-readable storage media.

Design program 104, and component library 106 are stored in persistent storage 908 for execution and/or access by one or more of the respective computer processors 904 via one or more memories of memory 906. Design program 104 has access to component library 106. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 910, in these examples, provides for communications with other data processing systems or devices, including resources of computer 102. In these examples, communications unit 910 includes one or more network interface cards. Communications unit 910 may provide communications through the use of either or both physical and wireless communications links. Design program 104 and component library 106 may be downloaded to persistent storage 908 through communications unit 910.

I/O interface(s) 912 allows for input and output of data with other devices that may be connected to computer 102. For example, I/O interface 912 may provide a connection to external device(s) 918 such as a keyboard, a keypad, a touch screen, and/or some other suitable input device. External device(s) 918 can also include portable computer-readable storage media such as, for example, thumb drives, portable optical or magnetic disks, and memory cards. Software and data used to practice embodiments of the present invention, e.g., design program 104 and component library 106, can be stored on such portable computer-readable storage media and can be loaded onto persistent storage 908 via I/O interface(s) 912. I/O interface(s) 912 also connect to a display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described embodiments for a method for correcting early-mode timing violations (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

The methods described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

What is claimed is:

1. A method of correcting early-mode timing violations in a digital circuit design, the method comprising:
    performing, by one or more computer processors, logic synthesis of a digital circuit design to create a netlist, wherein the netlist includes a portion of the digital circuit design having an early-mode timing violation;
    identifying, by one or more computer processors, the portion of the digital circuit design having the early-mode timing violation;
    identifying, by one or more computer processors, a first logic circuit within the identified portion having the early-mode timing violation;
    identifying, by one or more computer processors, at least one input of the first logic circuit having the early-mode timing violation;
    replacing, by one or more processors, the first logic circuit with an alternative logic circuit in the digital circuit design, wherein, when compared to the first logic circuit, the alternative logic circuit includes at least one additional transistor connected in series on one or both of a PMOS side and an NMOS side of the alternative logic circuit, and wherein the alternative logic circuit is configured to utilize the least one additional transistor to delay a signal received at an input of the an alternative logic circuit to eliminate the early-mode timing violation; and
    manufacturing a circuit based, at least in part, on the digital circuit design.

2. The method of claim 1, wherein replacing, by one or more processors, the first logic circuit with an alternative logic circuit in the digital circuit design does not create new late-mode timing violations.

3. The method of claim 1, further comprising:
    performing, by one or more computer processors, timing analysis of a digital circuit design to detect early-mode timing violations and late-mode timing violations in the portion of the digital circuit design;
    responsive to adding the alternative logic circuit to the first logic circuit, performing, by one or more computer processors, early mode padding on at least a portion of the digital circuit design, wherein a number of delay elements added to the digital circuit design to correct early-mode timing violations is reduced by the addition of the alternative logic circuit;
    verifying, by one or more computer processors, timing on at least a portion of the digital circuit design to detect new late-mode timing violations;
    responsive to a detection of a new late-mode timing violation in the digital circuit design, replacing, by one or more computer processors, at least one transistor with an alternate at least one transistor in the digital circuit design; and
    responsive to correcting one or both of early-mode timing violations and late-mode timing violations, performing, by one or more computer processors, placement and routing of the digital circuit design.

4. The method of claim 1, wherein replacing, by one or more processors, the first logic circuit with an alternative logic circuit in the digital circuit design include:
    connecting a drain of a first transistor with a source of a second transistor; and
    connecting a common signal to the input of the first transistor and the second transistor such that an additional capacitive load is created that delays a release of the common signal into a remainder of the digital circuit design.

5. The method of claim 1, wherein replacing, by one or more processors, the first logic circuit with an alternative logic circuit in the digital circuit design include:
    adding, by one or more processors, at least one transistor to a multiple input CMOS technology logic circuit of the digital circuit design.

6. The method of claim 1, wherein replacing, by one or more processors, the first logic circuit with an alternative logic circuit in the digital circuit design include:
    connecting, by one or more processors, at least one transistor on an NMOS portion of a CMOS logic circuit of the digital circuit design such that a falling edge of a signal is delayed in the digital circuit design.

7. The method of claim 1, wherein replacing, by one or more processors, the first logic circuit with an alternative logic circuit in the digital circuit design include:
    connecting, by one or more processors, at least one transistor on a PMOS portion of a CMOS logic circuit of the digital circuit design such that a rising edge of a signal is delayed in the digital circuit design.

8. A computer program product for correcting early-mode timing violations in a chip design, the computer program product comprising:
    one or more computer-readable storage media and program instructions stored on the one or more computer-readable storage media, the program instructions comprising:
    program instructions to perform logic synthesis of a digital circuit design to create a netlist, wherein the netlist includes a portion of the digital circuit design having an early-mode timing violation;
    program instructions to identify the portion of the digital circuit design having the early-mode timing violation;
    program instructions to identify a first logic circuit within the identified portion having the early-mode timing violation;
    program instructions to identify at least one input of the logic circuit having the early-mode timing violation;
    program instructions to replace the first logic circuit with an alternative logic circuit in the digital circuit design, wherein, when compared to the first logic circuit, the alternative logic circuit includes at least one additional transistor connected in series on one or both of a PMOS side and an NMOS side of the alternative logic circuit, and wherein the alternative logic circuit is configured to utilize the least one additional transistor to delay a signal received at an input of the an alternative logic circuit to eliminate the early-mode timing violation; and program instructions to manufacture a circuit based, at least in part, on the digital circuit design.

9. The computer program product of claim 8, wherein the program instructions to replace the first logic circuit with an alternative logic circuit in the digital circuit design include program instructions to not create new late-mode timing violations.

10. The computer program product of claim 8, further comprises:
   program instructions to perform timing analysis of a digital circuit design to detect early-mode timing violations and late-mode timing violations in a portion of a digital circuit design;
   program instructions to respond to an addition of the alternative logic circuit to the digital circuit design, by performing early mode padding on at least a portion of the digital circuit design, wherein a number of delay elements added to the digital circuit design to correct early-mode timing violations is reduced by the addition of the alternative logic circuit;
   program instructions to verify timing on at least a portion of the digital circuit design to detect new late-mode timing violations;
   program instructions to respond detection of a new late-mode timing violation by replacing at least one transistor with an alternate at least one transistor in the digital circuit design; and
   program instructions to respond to a correction of one or both of in early-mode timing violations and late-mode timing violations, by performing placement and routing of the digital circuit design.

11. The computer program product of claim 8, wherein the program instructions to replace the first logic circuit with an alternative logic circuit in the digital circuit design include:
   program instructions to connect a drain of a first transistor with a source of a second transistor; and
   program instructions to connect a common signal to the input of the first transistor and the second transistor such that an additional capacitive load is created that delays a release of the common signal into a remainder of the circuit.

12. The computer program product of claim 8, wherein the program instructions to replace the first logic circuit with an alternative logic circuit in the digital circuit design include:
   program instructions to add at least one transistor to a multiple input CMOS technology logic circuit of the digital circuit design.

13. The computer program product of claim 8, wherein the program instructions to replace the first logic circuit with an alternative logic circuit in the digital circuit design include:
   program instructions to connect at least one transistor on an NMOS portion of a CMOS logic circuit of the digital circuit design such that a falling edge of a signal is delayed in the digital circuit design.

14. The computer program product of claim 8, wherein the program instructions to replace the first logic circuit with an alternative logic circuit in the digital circuit design include:
   program instructions to connect at least one transistor on a PMOS portion of a CMOS logic circuit of the digital circuit design such that a rising edge of a signal is delayed in the digital circuit design.

\* \* \* \* \*